US007231035B2

(12) United States Patent
Walker et al.

(10) Patent No.: US 7,231,035 B2
(45) Date of Patent: Jun. 12, 2007

(54) METHOD AND APPARATUS FOR ENTERTAINING CALLERS IN A QUEUE

(75) Inventors: Jay S. Walker, Ridgefield, CT (US); James A. Jorasch, Stamford, CT (US); Thomas M. Sparico, New York, NY (US); Michael D. Downs, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 820 days.

(21) Appl. No.: 09/973,581

(22) Filed: Oct. 9, 2001
(Under 37 CFR 1.47)

(65) Prior Publication Data
US 2002/0067823 A1 Jun. 6, 2002

Related U.S. Application Data

(63) Continuation-in-part of application No. 09/657,338, filed on Sep. 7, 2000, now Pat. No. 6,301,354, which is a continuation of application No. 09/434,477, filed on Nov. 5, 1999, now Pat. No. 6,178,240, which is a continuation of application No. 08/826,930, filed on Apr. 8, 1997, now Pat. No. 6,014,439.

(51) Int. Cl.
*H04M 3/00* (2006.01)
(52) U.S. Cl. ............. 379/266.01; 379/309; 379/265.02
(58) Field of Classification Search .......... 379/266.01, 379/265.02, 309, 211, 212, 265.09, 201, 266.07
See application file for complete search history.

(56) References Cited
U.S. PATENT DOCUMENTS

| | | | |
|---|---|---|---|
| 3,997,718 A | 12/1976 | Ricketts et al. ............... 178/6.8 |
| 4,468,528 A | 8/1984 | Reece et al. ............... 179/18 B |
| 4,577,067 A | 3/1986 | Levy et al. ............... 179/99 H |
| 4,706,275 A | 11/1987 | Kamil ......................... 379/144 |
| 4,788,715 A | 11/1988 | Lee ............................ 379/84 |
| 4,893,330 A | 1/1990 | Franco ........................ 379/91 |
| 4,953,204 A | 8/1990 | Cuschleg, Jr. et al. ...... 379/266 |
| 4,975,942 A | 12/1990 | Zebryk ....................... 379/144 |
| 5,003,584 A | 3/1991 | Benyacar et al. ........... 379/119 |
| 5,020,095 A * | 5/1991 | Morganstein et al. .... 379/88.23 |
| 5,020,152 A | 5/1991 | Glista, Jr. ................... 455/601 |
| 5,058,152 A | 10/1991 | Solomon et al. ............. 379/67 |
| 5,146,491 A | 9/1992 | Silver et al. ................ 379/114 |

(Continued)

FOREIGN PATENT DOCUMENTS

WO     WO 98/10558     12/1998

OTHER PUBLICATIONS

"Audio.Com (North Miami, Florida) is Working to Turn Telephone Hold Time into a Prime Promotional Opportunity", Advertising Age, Dec. 20, 1982, pg. 24MW1.
"Callers Don't Mind Hearing Helpful Ads When on Hold", Telecommunication Alert, Dec. 1990, vol. 8, No. 12.
Doyle, T.C., Wordperfect's Mix Deejays Offer Users Toll-free Easy Listening, Computer Reseller News, Jan. 6, 1992, pg. 114.

(Continued)

*Primary Examiner*—Fan Tsang
*Assistant Examiner*—Olisa Anwah

(57) ABSTRACT

One embodiment of the invention provides for receiving a call from a caller, the call being associated with a first merchant; placing the call in a queue; determining a second merchant; and establishing a connection, the connection enabling communication between the caller and the second merchant while the call is in the queue.

7 Claims, 15 Drawing Sheets

U.S. PATENT DOCUMENTS

| | | | |
|---|---|---|---|
| 5,148,474 A | 9/1992 | Haralambopoulos et al. | 379/111 |
| 5,163,086 A | 11/1992 | Ahearn et al. | 379/91 |
| 5,166,974 A | 11/1992 | Morganstein et al. | 379/67 |
| 5,204,894 A | 4/1993 | Darden | 379/88 |
| 5,222,121 A | 6/1993 | Shimada | 379/88 |
| 5,249,219 A | 9/1993 | Morganstein et al. | 379/84 |
| 5,251,252 A | 10/1993 | Katz | 379/92 |
| 5,287,403 A | 2/1994 | Atkins et al. | 379/144 |
| 5,311,574 A | 5/1994 | Livanos | 379/88 |
| 5,353,335 A | 10/1994 | D'Urso et al. | 379/67 |
| 5,359,642 A | 10/1994 | Castro | 379/121 |
| 5,420,926 A | 5/1995 | Low et al. | 380/24 |
| 5,436,967 A * | 7/1995 | Hanson | 379/210.01 |
| 5,444,774 A | 8/1995 | Friedes | 379/266 |
| 5,469,497 A | 11/1995 | Pierce et al. | 379/115 |
| 5,483,588 A | 1/1996 | Eaton et al. | 379/202 |
| 5,485,510 A | 1/1996 | Colbert | 379/145 |
| 5,488,411 A | 1/1996 | Lewis | 348/8 |
| 5,511,112 A | 4/1996 | Szlam | 379/88 |
| 5,513,117 A | 4/1996 | Small | 364/479 |
| 5,515,421 A | 5/1996 | Sikand et al. | 379/67 |
| 5,521,631 A | 5/1996 | Budow et al. | 348/7 |
| 5,528,670 A | 6/1996 | Elliot et al. | 379/89 |
| 5,537,464 A | 7/1996 | Lewis et al. | 379/114 |
| 5,546,446 A | 8/1996 | Tsunokawa et al. | 379/114 |
| 5,557,109 A | 9/1996 | Bidnyy et al. | 379/112 |
| 5,559,871 A | 9/1996 | Smith | 379/115 |
| 5,561,707 A | 10/1996 | Katz | 379/88 |
| 5,565,908 A | 10/1996 | Ahmad | 348/7 |
| 5,581,270 A | 12/1996 | Smith et al. | 345/2 |
| 5,592,537 A | 1/1997 | Moen | 379/67 |
| 5,603,078 A | 2/1997 | Henderson et al. | 455/5.1 |
| 5,608,785 A | 3/1997 | Kasday | 379/90 |
| 5,621,787 A | 4/1997 | McKoy et al. | 379/144 |
| 5,627,884 A * | 5/1997 | Williams et al. | 379/88.16 |
| 5,638,426 A | 6/1997 | Lewis | 379/90 |
| 5,651,058 A | 7/1997 | Hackett-Jones et al. | 379/201 |
| 5,675,637 A * | 10/1997 | Szlam et al. | 379/142.17 |
| 5,715,298 A | 2/1998 | Rogers | 379/91.01 |
| 5,729,279 A | 3/1998 | Fuller | 348/8 |
| 5,749,075 A | 5/1998 | Toader et al. | 705/14 |
| 5,767,894 A | 6/1998 | Fuller et al. | 348/8 |
| 5,784,565 A | 7/1998 | Lewine | 395/200.59 |
| 5,818,512 A | 10/1998 | Fuller | 348/8 |
| 5,818,836 A | 10/1998 | DuVal | 370/389 |
| 5,825,863 A | 10/1998 | Walker | 379/144 |
| 5,835,126 A | 11/1998 | Lewis | 348/8 |
| 5,867,566 A | 2/1999 | Hogan et al. | 379/115 |
| 5,872,834 A | 2/1999 | Teitelbaum | 379/93.03 |
| 5,875,231 A * | 2/1999 | Farfan et al. | 379/67.1 |
| 5,884,284 A | 3/1999 | Peters et al. | 705/30 |
| 5,946,378 A * | 8/1999 | Farfan | 379/88.23 |
| 5,946,388 A | 8/1999 | Walker et al. | 379/266 |
| 5,978,467 A * | 11/1999 | Walker et al. | 379/266.01 |
| 6,002,760 A * | 12/1999 | Gisby | 379/266.01 |
| 6,014,439 A | 1/2000 | Walker et al. | 379/266 |
| 6,049,603 A * | 4/2000 | Schwartz et al. | 379/309 |
| 6,139,431 A | 10/2000 | Walker et al. | 463/20 |
| 6,178,240 B1 | 1/2001 | Walker et al. | 379/266 |
| 6,208,729 B1 * | 3/2001 | Agraharam et al. | 379/215.01 |
| 6,301,354 B1 | 10/2001 | Walker et al. | 379/266.01 |
| 6,366,668 B1 * | 4/2002 | Borst et al. | 379/266.04 |
| 6,400,804 B1 * | 6/2002 | Bilder | 379/76 |
| 6,614,783 B1 * | 9/2003 | Sonesh et al. | 370/352 |
| 6,665,396 B1 * | 12/2003 | Khouri et al. | 379/266.01 |
| 6,724,885 B1 * | 4/2004 | Deutsch et al. | 379/265.02 |
| 6,801,620 B2 * | 10/2004 | Smith et al. | 379/266.01 |
| 6,820,260 B1 * | 11/2004 | Flockhart et al. | 717/173 |
| 6,925,161 B2 * | 8/2005 | Burg et al. | 379/201.01 |
| 6,940,962 B1 * | 9/2005 | Hansen et al. | 379/265.02 |
| 6,959,081 B2 * | 10/2005 | Brown et al. | 379/265.11 |
| 2002/0191775 A1 * | 12/2002 | Boies et al. | 379/266.01 |
| 2003/0031309 A1 * | 2/2003 | Rupe et al. | 379/265.02 |
| 2003/0161464 A1 * | 8/2003 | Rodriguez et al. | 379/266.01 |
| 2004/0174980 A1 * | 9/2004 | Knott et al. | 379/266.01 |
| 2005/0074108 A1 * | 4/2005 | Dezonno et al. | 379/203.01 |
| 2005/0195961 A1 * | 9/2005 | Pasquale et al. | 379/265.02 |

OTHER PUBLICATIONS

"Acquistion: US West Marketing Resources Acquires Please Hold Promotions.", Edge, on & about AT&T, Mar. 7, 1994, vol. 9, No. 293, pg. 25(1).

Valenz, Shari, "Going Past the Tip of the Iceberg: Unified Messaging and Multimedia Apps are Voice Mail's Future.", Teleconnect, Apr. 1994, vol. 12, No. 4, pg. 66(28), ISSN: 0740-9354.

Higgins, Terry, "Since we're Always on Hold, We might As Well Dance to it.", Business Journal-Milwaukee, Apr. 9, 1994, vol. 11, No. 27, pg. 5A(1).

Day, Charles E., "New Technologies that Facilitate Integrated Inbound/Outbound Marketing", Telemarketing, May 1994, vol. 12, No. 11, pg. 75(4).

Day, Charles E., "Call-blending Technology that Suits your Needs: Predictive Dialer Manufacturer's Perspective", Telemarketing, Jan. 1995, vol. 13, No. 7 pg. 56(2).

Manrique, John, "Focus On: Options for On-Hold Messaging Equipment.", Telemarketing, Mar. 1995, vol. 13, No. 9, pg. 53(3).

Ousey, Alison, "Voice Mail: New Directions." Teleconnect, Apr. 1995, vol. 13, No. 4, pg. 63(25), ISSN: 0740-9354.

"Focus on: What to Expect from an On-hold Message Service Provider.", Telemarketing, Aug. 1995, vol. 14, No. 2, pg. 38(3).

"US Call Center Hardware and Software Markets", Frost & Sullivan, Feb. 1996.

Kidd, Joe, "Oregon's Symantec Hires Telephone 'QJS' to Entertain Callers", Register-Guard, Feb. 22, 1996.

Deixler, Lyle, "Teledata's Call Link for Windows.", Teleconnect, Mar. 1996, vol. 14, No. 3, pg. 44(2).

Hall, Susan Bard, "Hotels Dialing Up 'On Hold' Promos", Hotel & Motel Management, Mar. 18, 1996, vol. 211, No. 5, pg 10.

Anderson, J, "Microsoft Return of the Arcade.", Computer Gaming World, May 1996, No. 142, pg. 54(1).

Ousey, Alison, "On-Hold Messaging.", Teleconnect, Sep. 1996, vol. 14, No. 9, pg. 54(12).

Pulliam, Liz, "College Students May Learn the Hardest Accounting Lessons Outside the Classroom.", The Orange County Register, Sep. 1, 1996, Business Section, pg. K01.

"Kids Phone Usage Another Way for Marketers to get Connected", Phillips Business Information, Inc. Jan. 22, 1997.

"CollegeTalk: A must for any family with a student in college.", (http//www adforce com/video/ctalk.htm), download date: May 21, 1997.

"US West, Qwest Create Phone Alliance", The Arkansas Democrat-Gazette, May 11, 1998, Section: News, pg. D2.

* cited by examiner

| | CUSTOMER NAME 320 | CUSTOMER ID 322 | ADDRESS 325 | TELEPHONE NUMBER (ANI) 330 |
|---|---|---|---|---|
| 310 → | JOHN SMITH | AAA | 123 MAIN ST. | (203) 555-1212 |
| 311 → | FRANK JONES | BBB | 245 TOWER RD. | (415) 555-1212 |
| 312 → | MARY PARKER | CCC | 513 STATE ST. | (212) 555-1212 |

300 (CONT.)

| CUSTOMER DATA 335 | PAID ENTERTAINMENT OPTION ACCESS FLAG 340 | EXPERT DATA 345 | CREDIT CARD ACCOUNT NUMBER 350 |
|---|---|---|---|
| REGULAR PURCHASER | NO ACCESS - PRIOR FRAUDULENT USAGE | GARDENING | 1234-1234-1234-1234 |
| INFREQUENT PURCHASER | NO COMPLIMENTARY ACCESS | EUROPEAN TRAVEL | 5678-5678-5678-5678 |
| FREQUENT PURCHASER | PROVIDE ACCESS | PERSONAL COMPUTERS | 6789-6789-6789-6789 |

FIG. 3

| CALL TRACKING NUMBER 420 | CUSTOMER IDENTIFIER 422 | CALL SUBJECT CATEGORY 425 | CALL POSITION 430 |
|---|---|---|---|
| TS1458 | AAA | PRINTER PROBLEM | 005 |
| JJ9724 | BBB | SYSTEM ERROR | 016 |
| SJ0691 | CCC | FLIGHT RESERVATION (NYC) | 025 |

411 → TS1458
412 → JJ9724
413 → SJ0691

400

| CALL PHONE NUMBER (ANI) 435 | CHANNEL NUMBER 440 | TIME CALL WAS RECEIVED 445 | ATTENDENT IDENTIFICATION NUMBER 450 |
|---|---|---|---|
| (203) 555-1212 | 14 | 10:05 PM | BV2069 |
| (414) 555-1212 | 07 | 11:12 PM | JR6801 |
| (212) 555-1212 | 26 | 9:38 AM | TM9724 |

| ATTENDANT IDENTIFICATION NUMBER 520 | ATTENDANT STATUS 525 | AREA OF EXPERTISE 530 |
|---|---|---|
| BV2069 | BUSY | PRINTERS |
| JR6081 | BUSY | MODEMS |
| TM9724 | AVAILABLE | RESERVATIONS |

FIG. 5

| PREMIUM ENTERTAINMENT SERVICE 620 | CONTENT PROVIDER 625 | ACCESS INFORMATION 630 | ACCOUNT NUMBER 635 | PASSWORD 640 | COST 645 |
|---|---|---|---|---|---|
| INTERNET | WEB SPORTS, INC. | HTTP://WWWW.SPORTS.COM | 85069 | APACHE | $10/MONTH |
| 900 NUMBER | WEATHER SERVICE | 1-900-555-1212 | 98761 | SESAME | $2/MINUTE |
| PAY-PER-VIEW | CABLE BOXING EVENTS | CHANNEL 15 | 12345 | ROCK | $1/MINUTE |

FIG. 6

| CONNECTION ID NUMBER 720 | CUSTOMER ID 722 | CALLER TELEPHONE NUMBER 725 | DATE 730 |
|---|---|---|---|
| 469F | AAA | (203) 555-1212 | 05/07/2003 |
| 243J | BBB | (414) 555-1212 | 05/07/2003 |
| 682X | CCC | (212) 555-1212 | 05/07/2003 |
| 375H | DDD | (917) 555-1212 | 05/07/2003 |

| TIME 735 | CONNECTION DURATION 740 | ENTERTAINMENT OPTION 745 | COST 750 |
|---|---|---|---|
| 11:18 AM | 15 MINUTES | WEB SPORTS, INC. | $1 |
| 11:19 AM | 3 MINUTES | CABLE BOXING EVENTS | $3 |
| 11:22 AM | 16 MINUTES | BOOK MERCHANT | $0 |
| 11:23 AM | 14 MINUTES | TRAVEL CHAT ROOM | $0 |

FIG. 7

| MERCHANT NAME 820 | MERCHANT ID 825 | ACCESS INFORMATION 830 | DISCOUNT INFORMATION 835 |
|---|---|---|---|
| TRAVELCO. | 001 | 1-888-PROMO-DEAL | 10% OFF ANY PURCHASE |
| BOOKS4TRAVEL | 002 | HTTP://WWW.BOOKS4TRAVEL.COM/CALLERDISCOUNT/INDEX.HTML | FREE SHIPPING |
| GIFTCO. | 003 | DIGITAL CERTIFICATE: 129876543; HTTP://WWW.GETFREESTUFFONHOLD.COM | OFFER ID: PA04 |

| SPONSORING MERCHANT 920 | OFFER ID 925 | BENEFIT 930 | OBLIGATION 935 | QUALIFICATIONS 940 |
|---|---|---|---|---|
| MIKE'S BOOK CO. | ZQ98 | $10 OFF ANY PURCHASE | SWITCH LONG DISTANCE CARRIER | ON HOLD TIME > 15 MINS. |
| 002 | RX33 | 500 FREQUENT FLYER MILES | NONE | FREQUENT PURCHASER |
| 003 | PA04 | FREE SHIPPING | LISTEN TO MARKETING PITCH | NONE |

911 → (row 1)
912 → (row 2)
913 → (row 3)

900

FIG. 9

METHOD AND APPARATUS FOR ENTERTAINING CALLERS IN A QUEUE

CROSS REFERENCE TO RELATED APPLICATIONS

The present application is a continuation-in-part of U.S. patent application Ser. No. 09/657,338, filed Sep. 7, 2000 now U.S. Pat. No. 6,301,354; which is a continuation of U.S. patent application Ser. No. 09/434,477, filed Nov. 5, 1999 and issued Jan. 23, 2001 as U.S. Pat. No. 6,178,240 B1; which is a continuation of U.S. patent application Ser. No. 08/826,930, filed Apr. 8, 1998 and issued Jan. 11, 2000 as U.S. Pat. No. 6,014,439. Each of the above related applications is incorporated herein by reference.

FIELD OF THE INVENTION

The present invention relates generally to a system for entertaining callers waiting in a queue and more particularly, to a system for offering such callers a plurality of entertainment options, such as the option to make a purchase of goods or services from a third party.

BACKGROUND OF THE INVENTION

Telephone-based customer service plays an increasingly important role for organizations involved in activities requiring direct communication with customers. In order to serve a maximum number of callers, call centers are typically designed to optimize call handling efficiency and telephone attendant productivity. Many conventional systems allow telephone attendants to service a greater number of callers by ascertaining the nature of a caller's request through collection, by a live attendant, of initial information from the caller, and transferring the call to a voice response unit to address the specific request of the caller. Other systems reverse the answer and collection process by connecting the caller initially to a voice response unit that collects information on the nature of a caller's request. The information is ultimately used to route the call to an appropriate attendant.

An Automatic Call Distributor (ACD) is commonly utilized by call centers to enhance attendant productivity. An ACD allows a call center to handle a large number of calls cost-effectively by placing some of the calls in a queue when no attendants are available. When a call is placed in the queue, a greeting message is typically played to the caller, identifying the called party and indicating that the next available attendant will service the call.

Call queuing plays an important role in call center operations and provides many advantages to the call center, including: increased attendant productivity, by minimizing idle time for the attendant; simultaneous handling of a greater number of calls during an increase in calls; and encouragement of callers to wait for an available attendant, as opposed to requiring the caller to attempt another call in response to a busy signal. Call queuing, however, is perceived by customers to be a waste of their time, and may result in frustration, abandoned calls, a loss of business, and poor customer satisfaction when the holding time is deemed excessive.

Thus, in order to entertain callers waiting in a call queue, many call centers play music, news, weather or advertising messages to the caller during the holding period. In this manner, the caller may be entertained or informed of sales promotions for particular products or services. For example, U.S. Pat. No. 5,444,774 to Friedes discloses an Interactive Queuing System For Call Centers and suggests that music or advertising messages may be played to a caller on hold.

Unfortunately, such conventional call queuing entertainment systems have experienced only marginal success in satisfying callers placed in a queue. Since most callers can already access such conventional and freely available programming sources directly from their home, such programming is generally not a sufficient novelty or value to the caller, nor does it allow the caller to make effective use of the holding time, nor does it generally minimize the frustration experienced by the caller as a result of an excessive hold time. Conventional systems for entertaining callers placed on hold by a call center also do not permit a caller to select a desired entertainment option.

SUMMARY OF THE INVENTION

One embodiment of the invention provides for receiving a call from a caller, the call being associated with a first merchant; placing the call in a queue; determining a second merchant; and establishing a connection, the connection enabling communication between the caller and the second merchant while the call is in the queue.

BRIEF DESCRIPTION OF DRAWINGS

FIG. 3 illustrates a sample table from the customer account database of FIG. 2;

FIG. 4 illustrates a sample table from the call database of FIG. 2;

FIG. 5 illustrates a sample table from the attendant database of FIG. 2;

FIG. 6 illustrates a sample table from the content database of FIG. 2;

FIG. 7 illustrates a sample table from the connection record database of FIG. 2;

FIG. 8 illustrates a sample table from the merchant database of FIG. 2;

FIG. 9 illustrates a sample table from the offer database of FIG. 2;

DETAILED DESCRIPTION

Figure 1:
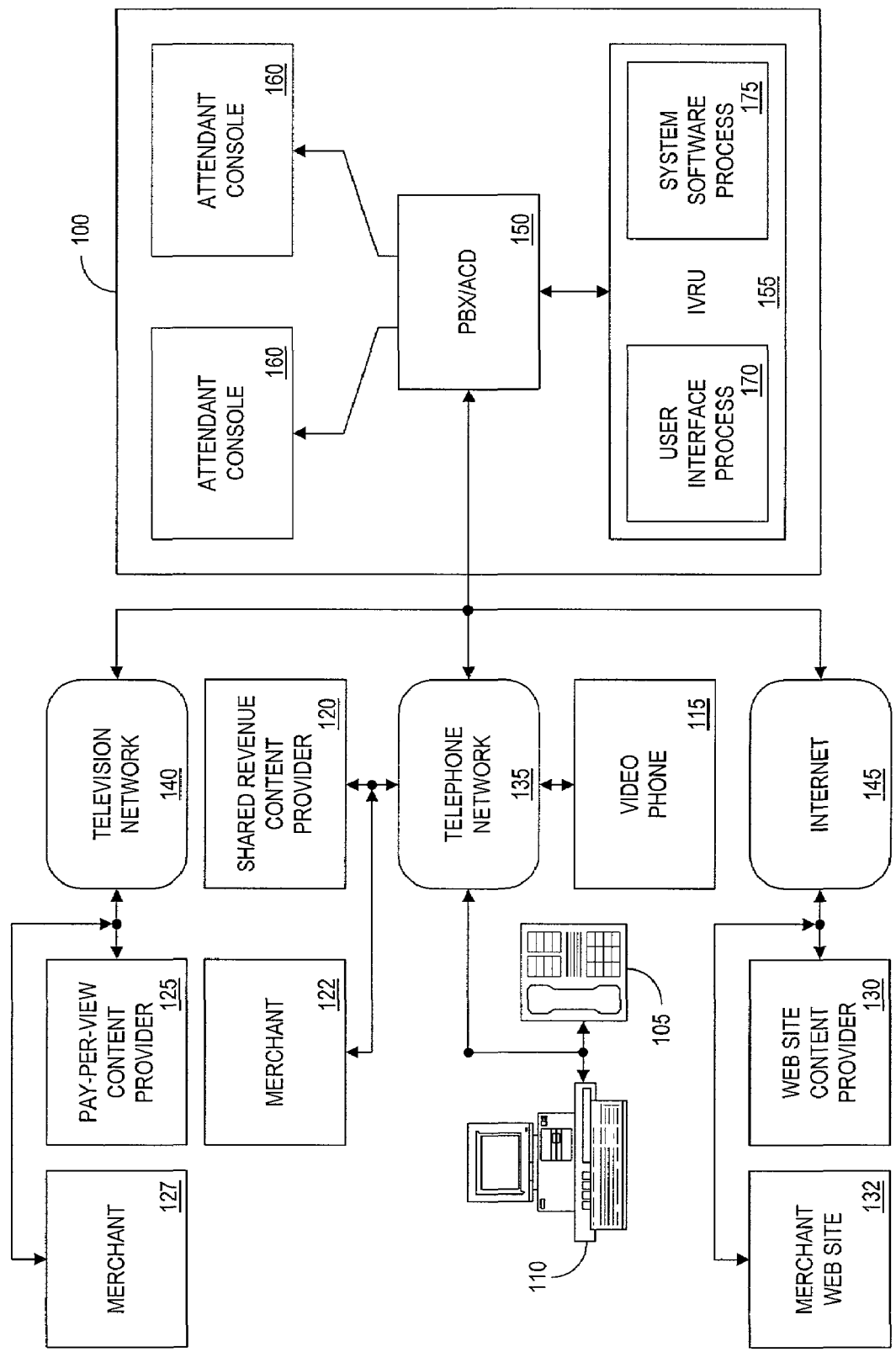
FIG. 1 is a schematic block diagram of a communication switching system in accordance with one embodiment of the present invention.

Generally, according to various embodiments of the invention, a caller placed in a queue of a call center will be permitted to access at least one entertainment option while on hold. The entertainment options permit the caller to (i) place a free or subsidized call to a third party; (ii) access one or more entertainment services; (iii) shop at one or more merchants; or (iv) receive one or more offers. Available entertainment services may include at least one premium entertainment service. A premium entertainment service is a service for which a fee is normally charged for the use of that service. A merchant is meant to describe a provider of goods and/or services. As is well known in the art, call centers are frequently associated with merchants. Embodiments of the invention thus allow a caller to the call center of a first merchant to shop at one or more other merchants while on hold with the call center. According to a further aspect of the invention, access to the entertainment options can be provided to a caller on a complimentary basis, or for an additional payment which may be less than the typical cost of such a service. Thus, while any of the entertainment options normally may be available to a caller without first calling the call center, the lower cost may provide an incentive to the caller to access the entertainment options through the call center.

A call handling process is disclosed which incorporates features of the invention to allow the call center to (i) route a call to an appropriate attendant console within a pool of attendants, (ii) transfer calls to an interactive voice response unit (IVRU) when no attendants are available to service calls, (iii) place a call in a queue, if needed, and (iv) provide a caller on hold with access to the entertainment options.

A caller at a station set (e.g., a telephone, video phone, personal computer configured with appropriate telephony software, or a combination thereof) places a call to the call center. The call is routed via the public telephone network to the call center in a conventional manner. The call is preferably processed within the call center to a Private Branch Exchange switch (PBX) with Automatic Call Distribution (ACD) capability. The PBX/ACD is a switching system designed to receive calls destined for the call center and to queue the calls when an appropriate attendant is not available. In addition, the PBX/ACD distributes calls to attendants to ensure even call handling loads among attendants, in a known manner. The ACD functionality can be integrated with the PBX or provided by a separate unit. Of course, the call need not be processed by a PBX/ACD. For example, the functionality of a PBX/ACD may be provided manually by call center personnel.

The PBX/ACD is preferably connected to an interactive voice response unit (IVRU). The IVRU is a voice information system arranged to prompt a caller for specific information and forward the collected information to the PBX/ACD. In addition, the IVRU preferably provides a greeting to the caller identifying the called party, announces that the call will be handled by the next available attendant and provides the caller with an estimate of the period that the call will remain on hold. The functionality of the IVRU may be provided by means other than an IVRU, such as by personnel associated with the call center.

As is well known in the art, the term "on hold" is meant to indicate that the caller is connected to the called party, but is not currently in communication with an individual associated with the originally-called phone number. For example, a call may be placed in a queue until an attendant is available. Calls in a queue are typically transferred to an available attendant in the order in which the calls were received. Thus, each call in a queue may have an associated position relative to other calls in the queue. However, a call in a queue may be taken off hold, and/or the associated position may be changed, according to various factors, such as the call's importance or urgency, value to the call center, or a random selection. Further, those of ordinary skill in the art will appreciate that a call need not be placed in a queue to be considered to be on hold, but may simply be processed in any manner that allows the call to remain connected and then to be transferred once an attendant is available. For example, a received call may be assigned a status if no attendant is available, in which the status indicates the call is to remain connected and then is to be transferred to an available attendant.

According to various embodiments of the invention, the IVRU provides the caller with a menu or list of available entertainment options that can be accessed by the caller while the caller is on hold. The entertainment options need not be provided in the form of a menu or list. Preferably, the available entertainment options permit the caller, while on hold, to (i) place a free or subsidized call to a third party; (ii) access one or more entertainment services; (iii) shop or (iv) receive one or more offers.

Upon receipt of the caller's selection, the PBX/ACD provides the caller with access to the selected entertainment option while the caller is on hold.

Those of ordinary skill in the art will also appreciate that a caller may be placed on hold with respect to his connection to the call center while the caller enjoys a selected entertainment option via a second connection. For example, embodiments of the invention provide for a caller, on hold with the call center of a first merchant via a first connection, to be in communication with a second merchant via a second connection.

The PBX/ACD monitors the queue and determines when the call is ready to be handled by the next available attendant. Once an attendant is available to handle the call, a disconnect warning is preferably played to the caller, and the caller preferably can choose when to have the call transferred to the appropriate attendant console. The call is transferred to the attendant console along with any data that may be used by the attendant to process the call, in a known manner.

Once the connection to the selected entertainment option is terminated, an entry of the entertainment connection session is preferably made in a connection record database. The call center is preferably billed by each content or service provider for the total connection time. The billing information can be verified using the connection record database.

FIG. 1 shows an illustrative network environment for two-way transferring multimedia information, such as video, audio and data, between one or more callers at station sets 105, 110, 115, who are waiting in a queue of a call center 100, and one or more content providers, such as content providers 120, 125, 130, over one or more external networks 135, 140, 145. FIG. 1 also shows an illustrative network environment for enabling two-way communication, by video, audio and data, between one or more callers at station sets 105, 110, 115, who are waiting in a queue of a call center 100, and one or more merchants, such as merchants 122, 127, 132, over one or more external networks 135, 140, 145. According to a feature of the present invention, the call center 100 enables a caller placed in a queue to access an entertainment option while on hold. As used herein, the entertainment options permit the caller, while on hold, (i) to place a free or subsidized call to a third party while on hold; (ii) to access one or more entertainment services, such as premium entertainment services provided by content providers (e.g., content providers 120, 125, 130); (iii) to shop at one or more merchants (e.g., merchants 122, 127, 132) or (iv) to receive one or more offers.

A premium entertainment service, as used herein, is a service for which a fee is specifically charged for the use of that service, including shared-revenue telephone services such as 900 or 976 services, premium web sites, and pay-per-view services. It is noted that the fee incurred for a particular premium entertainment service may be a variable rate based on the amount of usage of the premium entertainment service (e.g., a per-minute rate) or a fixed fee for a predefined period of time (e.g., a flat monthly fee). According to a further feature of the invention, access to the entertainment options can be provided to a caller on a complimentary basis or for an additional payment.

Other entertainment services may be accessed by the caller. Such entertainment services may include a connection to another caller (or callers) on hold (e.g., a "chat room"). For example, two callers on hold with an airline may have indicated (e.g., via an IVRU) that they each would like to make a flight reservation to New York City. The PBX/ACD may then provide to each caller the option to be connected to another caller traveling to the same city. In this manner, callers may share information (e.g., best tourist sights in New York City) and/or socialize while on hold. Such a connection may be made available through any well-known means (e.g., telephone, instant messaging, email, video conferencing).

A caller on hold may be provided with the opportunity to answer questions from other callers. After connecting to the call center, a caller could declare an area of knowledge or expertise. The present system would then enable other callers interested in that area of knowledge to connect to the caller and ask her questions. For example, a caller on hold may indicate that she is knowledgeable about touring in Hawaii. Other callers on hold may be provided with the option to ask her questions about Hawaii or to listen to her conversation with another caller. Callers may be provided with the opportunity to rate the expert. In this manner, each "expert" may have an associated rating. As a reward to such experts, call center 100 could provide a small payment or product discounts. Alternatively, experts might receive priority processing such as an improved position within the queue.

In another embodiment, the expert may have an associated rate (or rates) that is charged to those to whom she provides information. For example, the system may charge one rate to callers who listen in to her conversations with other callers, and another rate for the opportunity to ask a question of the expert directly. The system may provide at least a portion of the amounts charged to the expert. The system may also subsidize, wholly or in part, the cost of accessing an expert as an incentive to callers to remain on hold.

Another entertainment service that may be provided is the ability for a caller on hold to record a performance or message. For example, a caller on hold may sing a song (e.g., karaoke), read a poem, perform a dance or skit, play a musical instrument, display an artwork, display photographs (e.g., vacation photographs), give a political opinion or tell a joke. In another embodiment, a caller on hold may be provided with the option to "surf" the connections of other callers while they are performing or leaving messages. If the caller finds a connection he finds interesting, he may remain on that connection in order to hear and/or view the performance.

Alternatively, a caller on hold may be provided with the option to "surf" or browse stored performances or other content recorded by callers while they were on hold. According to a further embodiment, a caller may rate a performance. According to another embodiment, callers on hold are provided with the option to listen to the highest rated performances. According to another embodiment, callers on hold are provided with the opportunity to listen to and/or vote for the best performances. For example, a caller on hold may be provided with the option to listen to the recorded joke that had been voted the best joke of the week. Live or recorded content may be moderated by the present system in order to ensure that it is appropriate.

Another entertainment service that may be provided is the ability for a caller on hold to participate in one or more surveys or polls. For example, a caller on hold with an airline may be asked to vote for his favorite of a selection of destination cities, or indicate his opinion regarding a current political issue. According to another embodiment, callers on hold may be provided the option of reviewing the results of such surveys.

According to another entertainment service that may be provided by the present invention, each caller on hold is provided the option to select a set of numbers (e.g., like a lottery ticket) at the beginning of his call. Every ten minutes a random drawing of numbers could be conducted. If the customer is on hold at the time of the drawing and his numbers match the drawn set, he wins a prize (e.g., airline tickets). According to an alternative embodiment, each customer could be entered once into a drawing. The probability of winning for each caller would be directly proportional to the length of time the caller spent on hold. A drawing could then be held periodically (e.g., once a month) to determine a winner. This entertainment service could be provided either at the election of the caller or automatically by the PBX/ACD. Similarly, a bingo game may be provided as an entertainment service, with the drawn numbers corresponding to a bingo card provided to the customer, for example, by mail, via email, or on a web site.

As shown in FIG. 1, a caller at a station set, such as station set 105, places a call to the call center 100. The station set 105 may be embodied as a conventional telephone, wireless telephone, personal digital assistant (PDA), handheld device, video phone, personal computer configured with appropriate telephony software, or a combination thereof. In addition, the station set 105 may be embodied with a connection to the Internet, which may or may not be the same connection through which the call is placed. The call is routed via the telephone network 135, discussed below, to the call center 100, in a conventional manner. The call is preferably routed within the call center 100 to a PBX switch with ACD capability. The PBX/ACD 150 is preferably connected to an IVRU 155. As discussed further below, the PBX/ACD 150 and the IVRU 155 may comprise conventional hardware and software, as modified herein to carry out the functions and operations of the present invention.

The PBX/ACD 150 maybe embodied, for example, using the AT&T Definity PBX with ACD capability, as modified herein to execute the functions and operations of the present invention. The PBX/ACD 150 is discussed more fully below in conjunction with FIG. 2. Generally, the PBX/ACD 150 is a switching system designed to receive calls destined for call center 100 and to queue the received calls when an appropriate attendant is not available. In addition, the PBX/ACD 150 distributes calls to attendants or specific groups of attendants according to a prearranged scheme, such as a hunt group, to ensure even call handling loads among attendants, in a known manner. The ACD functionality can be integrated with the PBX, as in the illustrative embodiment shown in FIG. 1, or provided by a separate unit.

The IVRU 155 is a voice information system arranged to (i) prompt a caller for specific information by asking questions based on a set of modules in a transaction script, (ii) collect that information by detecting and interpreting dual tone multifrequency (DTMF) signals entered by the caller or by recognizing speech input from the caller, (iii) organize the collected information in a specific format and (iv) forward the collected information to the PBX/ACD 150. The IVRU 155 may be embodied, for example, using the AT&T Conversant Voice System. For a detailed description of the AT&T Conversant Voice System, see AT&T Technical Journal, Vol. 65, Issue 5, pp. 34–47, September/October 1986, incorporated herein by reference.

Generally, the IVRU 155 includes a central processing unit (CPU) (not shown) which executes a user interface process 170 and a system software process 175. The user interface process 170 includes a transaction script including a sequence of questions to be posed to a caller to elicit answers in the form of DTMF signals or speech input. The modules of a transaction script are executed in a specified order (which may vary based on the caller's responses) to answer incoming calls destined for call center 100, and to greet callers with pre-recorded voice prompts to direct callers to enter specific information to process their calls. The system software process 175, on the other hand, includes primitives to detect DTMF signals entered by the caller and speech recognition software to identify speech input provided by a caller.

The PBX/ACD 150 and the IVRU 155 preferably transmit digitally encoded data and other information, including voice signals, between one another. The transmitted data and other information may represent caller name and an identifier that identifies the caller, (e.g., identification number), specific information entered by the caller in response to the sequence of posed questions, and a menu of entertainment options and caller selections. The communications link between the PBX/ACD 150 and the IVRU 155 preferably comprises a cable or wireless link on which electronic signals can propagate.

Once an attendant is available, the IVRU 155 preferably plays a short message to the caller indicating that the call is being connected to a live attendant and transfers the call along with the collected data to the PBX/ACD 150. The collected information is thereafter forwarded by the PBX/ACD 150 to an available attendant console 160 for display to the attendant who handles the call. Each attendant console 160 preferably includes a station set and an associated console or general purpose computer to enter or receive data used to complete a transaction with a caller.

It is noted that each content provider, such as content providers 120, 125, 130, preferably employs a general purpose computer for communicating with the call center 100. The general purpose computer of each content provider 120, 125, 130 is preferably comprised of a processing unit, a modem, memory means and appropriate audio/video hardware and software.

It is noted that each merchant, such as merchants 122, 127, 132, preferably employs a general purpose computer for communicating with the call center 100. The general purpose computer of each merchant 122, 127, 132 is preferably comprised of a processing unit, a modem, memory means and appropriate audio/video hardware and software.

The telephone network 135, as used herein, includes the combination of local and long distance wire or wireless facilities and switches known as the public switched telephone network (PSTN), as well as cellular network systems and the telephony feature of the Internet. The telephone network 135 is utilized to complete calls between (i) a caller at a station set, such as station sets 105, 110, 115, and the call center 100; (ii) a caller on hold and a third party; (iii) a caller on hold and a shared revenue telephone service, such as a 900 or 976 service, provided by content provider 120; and (iv) a caller on hold and a merchant 122. As is well known, shared-revenue telephone services deliver a particular service over the telephone and subsequently bill the caller. The caller is typically identified by the telephone number (ANI) from which the call is made, with the subsequent bill then included as part of the caller's regular telephone bill. The content provider typically calculates the amount of the bill after the service has been delivered. This amount is forwarded to the billing telephone company, which both bills and collects the appropriate amount from the caller. The telephone company typically deducts a portion of the total fee for the service in return for both the cost of making the telephone connection and for the telephone company's role as bill collector.

In one preferred embodiment, the caller can be presented with a list or menu of available shared-revenue telephone services or merchants by the IVRU 155, with the corresponding telephone number programmed for each content provider or merchant. The caller thereafter enters his selection of a desired content provider or merchant, which selection is transmitted to the PBX/ACD 150. Upon receiving the selection, the PBX/ACD 150 may automatically connect the caller with the appropriate content provider or merchant by dialing the corresponding telephone number and connecting the caller to the called party, in a known manner. Alternatively, the IVRU 155 may provide the corresponding telephone number to the caller.

The television network 140, as used herein, includes a wireless broadcast network for distribution of premium video programming, such as Digital Satellite Service (DSS), as well as a conventional wired cable television network (CATV). The premium entertainment services accessed via the television network 140 include pay-per-view video programming. A shopping channel provided by merchant 127 may also be accessed via the television network 140.

The Internet network 145, as used herein, includes the World Wide Web (the "Web") and other systems for storing and retrieving information using the Internet. To view a web site, the user communicates an electronic Web address, referred to as a Uniform Resource Locator (URL), associated with the web site. In one preferred embodiment, the caller can be presented with a list or menu of available premium web sites by the IVRU 155, with the corresponding URL programmed for each web site. The caller thereafter enters his selection of a desired premium web site, which selection is transmitted to the PBX/ACD 150. Upon receiving the selection, the PBX/ACD 150 may automatically connect the caller with the appropriate server. Alternatively, the IVRU 155 may provide the corresponding URL to the caller. A web browser software product, such as Netscape Navigator or Microsoft Internet Explorer, may be used to access the web site by communicating with the appropriate server, in a known manner. The premium entertainment services accessed via the Internet network 145 include premium web sites, such as ESPNET Sportszone. Merchants, such as web-site based merchant 132, may also be accessed via the Internet network 145. Access may be provided, for example, for a predetermined period of time, until the caller makes a purchase, until the caller finishes downloading an electronic information item, or until the call is taken off hold.

It is noted that if the caller accesses the call center 100 from a conventional telephone, the textual portions of a premium web site may be converted to speech for presentation to the caller. Alternatively, as noted above, a caller accessing the call center 100 from a conventional telephone may be provided with a URL corresponding to the content provider or merchant. The caller may then use the URL to access the web site via Internet network 145 using station set 105 or a separate connection (not shown) to Internet network 145.

Figure 2:
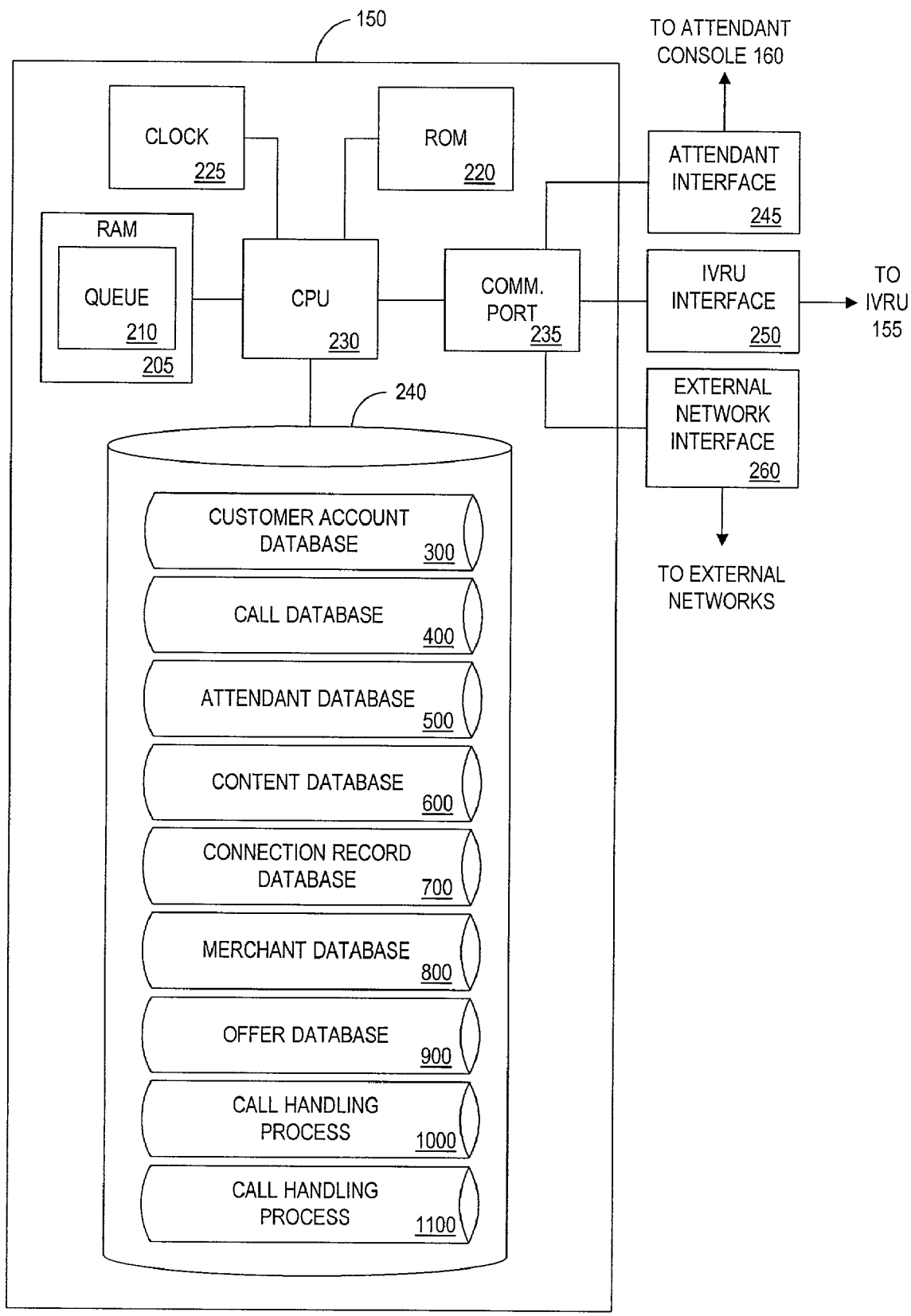
FIG. 2 is a schematic block diagram of the PBX/ACD of FIG. 1.

FIG. 2 is a block diagram showing the architecture of an illustrative PBX/ACD 150. As previously indicated, the PBX/ACD 150 may be embodied, for example, using the AT&T Definity PBX with ACD capability, as modified herein to execute the functions and operations of the present invention. The PBX/ACD 150 preferably includes certain standard hardware components, such as a central processing unit (CPU) 230, a data storage device 240, a read only memory (ROM) 220, a random access memory (RAM) 205, a clock 225, and a communications port 235. The CPU 230 is preferably linked to each of the other listed elements, either by means of a shared data bus, or dedicated connections, as shown in FIG. 2.

The CPU 230 may be embodied as a single processor, or a number of processors operating in parallel. The data storage device 240 and/or ROM 220 are operable to store one or more instructions, as discussed below in conjunction with FIGS. 10A, 10B and 10C, which the CPU 230 is operable to retrieve, interpret and execute. The RAM 205 preferably stores the queue 210 of indicators describing the order of the queued calls directed to the call center. The CPU 230 preferably includes a control unit, an arithmetic logic unit (ALU), and a CPU local memory storage device, such as, for example, a stackable cache or a plurality of registers, in a known manner. The control unit is operable to retrieve instructions from the data storage device 240 or ROM 220. The ALU is operable to perform a plurality of operations needed to carry out instructions. The CPU local memory storage device is operable to provide high speed storage used for storing temporary results and control information.

As discussed further below in conjunction with FIGS. 3 through 9, the data storage device 240 includes a customer account database 300, a call database 400, an attendant database 500, a content database 600, a connection record database 700, a merchant database 800, and an offer database 900. The customer account database 300 preferably stores information on each customer, such as biographical information and purchase history information. The call database 400 preferably stores information on each call being processed by the call center 100, including an indication of the position of the call within the queue 210. The attendant database 500 preferably stores information on each attendant, including an indication of the availability status of each attendant and his respective expertise.

The content database 600 preferably stores information used by the PBX/ACD 150 for each available premium entertainment service, including information for accessing the selected content provider, such as the appropriate external network and network address to be utilized, as well as any corresponding account number and/or password. The connection record database 700 preferably stores information on each connection session made by the PBX/ACD 150 to an entertainment service, including an indication of the duration or estimated cost of each connection session.

The merchant database 800 preferably stores information on each available merchant, including information for accessing a selected merchant, such as an associated external network and network address to be utilized, as well as any corresponding account number and/or password. A given merchant may be accessible via more than one external network, address, account number and/or password. The merchant database 800 also preferably stores merchant rules for determining whether to offer the caller the option to access a given merchant. The offer database 900 preferably stores information on one or more offers that may be presented to the caller, including offer rules for determining whether to provide an offer to the caller.

In addition, the data storage device 240 includes a call handling process 1000, discussed further below in conjunction with FIGS. 10A, 10B and 10C. Generally, the call handling process 1000 allows the PBX/ACD 150 to (i) route a call to an appropriate attendant console 160 within a pool of attendants, (ii) transfer calls to the IVRU 155 when no attendants are available to service a particular call, (iii) place a call in a queue, if needed, and (iv) provide a caller on hold with access to the entertainment options.

According to a feature of the present invention, if the caller selects a particular entertainment option, the PBX/ACD 150 determines the appropriate access to the entertainment option. Accordingly, if the caller elects to place a call to a third party while on hold, the caller is preferably prompted by the call handling process 1000 to enter the telephone number of the third party to be called. If the caller selects a particular entertainment service, the PBX/ACD 150 determines the appropriate access to the entertainment service. For example, if the caller selects a particular premium entertainment service, the PBX/ACD 150 accesses the content database 600 to retrieve any information used to access the selected content provider.

If the caller elects to purchase goods and/or services, the PBX/ACD 150 accesses the merchant database 800 to retrieve information for determining at least one merchant at which the caller may shop while on hold. Merchant database 800 preferably includes rules that may be used to determine to which merchants the caller should be given access. In this manner, the PBX/ACD may determine the at least one merchant based on information associated with the call, such as information collected from the caller by IVRU 155, or purchase history or demographic information stored in customer account database 300. For example, the PBX/ACD 150 may provide a caller desiring to make a flight reservation the options of shopping at a merchant that is appropriate for a traveler, such as a bookseller or a luggage retailer. The determination of which merchants a caller should be given access to need not be based on rules. Also, a caller need not be given the opportunity to select a merchant. For example, the PBX/ACD 150 may automatically select at least one merchant, in the manner described above, and enable the caller to be connected to the at least one merchant.

If the caller selects a particular merchant at which to shop, the PBX/ACD 150 accesses the merchant database 800 to retrieve information used to access the selected merchant, such as a telephone number or network address. Merchant database 800 is also accessed to retrieve any information relating to complimentary discounts, promotions, rewards or offers available to the customer while shopping at the merchant. In this way, a caller on hold may purchase goods or services from a merchant for a purchase amount that may be less than the typical cost of making the purchase at the merchant. Thus, while any of the merchants normally may be accessible by a caller without first calling the call center, the lower cost may provide an incentive to the caller to access the merchant through the call center.

If the caller elects to receive an offer (or offers), the PBX/ACD 150 accesses the offer database 900 to retrieve information for providing the caller at least one offer, or type of offer. Of course, it is not required that the caller elect to receive an offer. The PBX/ACD 150 may automatically provide an offer (or selection of offers) to a caller on hold. An offer may be provided to the caller based on information associated with the call, such as information collected from the caller by IVRU 155, or purchase history or demographic information stored in customer account database 300. For example, the PBX/ACD 150 may automatically inform a caller desiring to make a flight reservation that if the caller remains on hold until being connected to an agent, the caller will be rewarded with two frequent flyer miles for every minute that the caller was on hold.

A connection is thereafter established by the PBX/ACD 150 based on the access information between the caller and the selected entertainment option. The connection is preferably established while the call is on hold, but need not be. Embodiments of the invention also provide for the caller to be connected to more than one entertainment option. A caller may be connected to multiple entertainment options simultaneously. Alternatively, or in addition, a caller may be connected to a succession of entertainment options.

Alternatively, the PBX/ACD 150 may enable a connection between the caller and the selected entertainment option without the PBX/ACD 150 establishing the connection. For example, the PBX/ACD 150 may provide the caller with a URL corresponding to a web site of content provider 130, accessible by the caller via a separate Internet connection. The connection to the selected entertainment option may be enabled, for example, for a predetermined period of time, until the caller makes a purchase, until the caller finishes downloading an electronic information item, or until the call is taken off hold. According to one embodiment, the PBX/ACD 150 may be in communication with content provider 130 and may transmit a signal to content provider 130 indicating the call has been taken off hold. In response, content provider 130 may prevent the caller from accessing the web site content via the separate Internet connection.

The communications port 235 connects the PBX/ACD 150 to an attendant interface 245, an IVRU interface 250 and an external network interface 260, thereby linking the PBX/ACD 150 to each attendant console 160, the IVRU 155 and the external networks 135, 140, 145, respectively. The communications port 235 preferably includes multiple communication channels for simultaneously establishing a plurality of connections.

According to a feature of the present invention, the PBX/ACD 150 is capable of presenting entertainment options, including premium entertainment services received from one or more content providers 120, 125, 130, to a caller in a queue of the call center 100. As previously indicated, the premium entertainment services received from the content provider may be multimedia information, including video, audio and/or data information. Thus, the PBX/ACD 150 is preferably capable of transmitting such multimedia information to a caller.

As previously indicated, the customer account database 300, shown in FIG. 3, preferably stores information on each customer, including biographical information and purchase history information. The customer account database 300 maintains a plurality of records, such as records 310–312, each associated with a different customer. For each customer name listed in field 320, the customer account database 300 includes a customer identifier in field 322, the customer's address in field 325 and a telephone number in field 330. The customer identifier is any identifier that uniquely identifies a customer, such as an identification number. In addition, the customer account database 300 preferably includes customer data in field 335. For example, the customer data may indicate any purchases or reservations made by the customer, relevant customer history, history of accepted and rejected offers, or other information which may be used by the call center 100 to process a call from the given customer. Demographic data, such as gender or age information, could also be stored for each customer.

In one preferred embodiment, the customer account database 300 includes a flag in field 340 indicating whether the respective customer should be provided with access to the entertainment options during any holding periods. In this manner, the call center 100 can limit access to certain classes of customers, such as frequent purchasers, and deny access to customers who have previously made fraudulent usage of the entertainment options. For example, customers who make a practice of calling the call center 100 to access the complimentary paid entertainment options during the holding period and then hang up when an attendant becomes available should thereafter be denied complimentary access to the paid entertainment options.

The customer account database 300 also preferably includes expert data in field 345. For example, the expert data may include an indication of the customer's areas of expertise and any rates charged for providing the customer's expertise to other callers. The customer account database 300 also preferably includes an identifier that identifies a financial account associated with the customer, such as a credit card account number, in field 350.

As previously indicated, the call database 400, shown in FIG. 4, preferably stores information on each call being processed by the call center 100, including an indication of the position of the call within the queue. The call database 400 maintains a plurality of records, such as records 411–413, each associated with a different call being processed by the call center 100. For each call, the call database 400 preferably includes: a tracking number assigned by the call center 100 in field 420, an indication in field 422 of the customer identifier corresponding to the caller; an indication of the subject category associated with the call in field 425, based on initial information collected by the IVRU 155; an indication of the position of the call within the queue in field 430 and the telephone number (ANI) of the station set 105, 110, 115 which placed the call in field 435. In addition, the call database 400 identifies the channel number associated with the call in field 440, the time the call was received in field 445 and the identification number of the attendant handling the call (once assigned) in field 450. Database 400 need not include all of the above information. Of course, additional information may also be stored.

As discussed above, the attendant database 500, shown in FIG. 5, preferably stores information on each attendant utilized by the call center 100. The attendant database 500 maintains a plurality of records, such as records 511–513, each associated with a different attendant handling customer calls. For each attendant listed by identification number in field 520, the attendant database 500 includes the current availability status of the attendant in field 525 and an indication of any expertise of the attendant in field 530. Field 525 can also be utilized to identify any attendants who speak a particular foreign language.

Information used by the PBX/ACD 150 with respect to each available premium entertainment service is preferably stored in a content database, such as the content database 600 illustrated in FIG. 6. The content database 600 maintains a plurality of records, such as records 610–612, each associated with a different premium entertainment service. For each premium entertainment service option listed in field 620, the content database 600 includes an indication in field 625 of the appropriate content provider, such as the content provider 125, that provides the respective premium entertainment service. In addition, the content database 600 preferably contains any information that is used to access each premium entertainment service. In one embodiment, the content database 600 stores access information in field 630, an account number in field 635 and a password in field 640.

For example, if a particular premium entertainment service is a premium web site, the access information stored in field 630 may indicate that the web site is accessed via the Internet 145, and may contain the appropriate URL address. Similarly, if a premium entertainment service is a shared-revenue telephone service, the access information stored in field 630 may indicate that the shared revenue telephone service is accessed via the telephone network 135, and contain the appropriate 900 or 976 telephone number. Finally, if the premium entertainment service is a pay-per-view movie clip selection, the access information may indicate that the pay-per-view movie clip is accessed via a cable (or wireless) television network, such as the network 140, and contain the appropriate cable television channel number.

In one embodiment, the content database 600 also includes cost information in field 645 for each premium entertainment service. In this manner, the call center 100 can maintain estimated cost information for each connection session and implement variable per minute rates for one or more premium entertainment services.

As previously indicated, the PBX/ACD 150 preferably maintains a connection record database 700, shown in FIG. 7, for storing information on each connection session to an entertainment service. The connection record database 700 maintains a plurality of records, such as the records 710–712, each associated with a different connection session made by the PBX/ACD 150 to an entertainment service. For each connection session listed by an assigned identification number in field 720, the connection record database 700 preferably stores the telephone number of the customer who requested the connection in field 725, and the date, time and duration of the connection in fields 730, 735 and 740, respectively. In addition, the connection record database 700 preferably records an indication of the entertainment option (e.g., content provider 125, merchant 127), in field 745 that provides the entertainment option associated with the connection and an indication of the estimated cost of the connection in field 750. In this manner, the call center 100 has recorded the appropriate information, which may be required to verify any contested charges.

As previously indicated, the merchant database 800, shown in FIG. 8, preferably stores information on each merchant from which a customer may purchase goods and/or services. The merchant database 800 maintains a plurality of records, such as the records 810, 811, and 812, each associated with a different merchant. For each merchant name listed in field 820, the merchant database 800 includes a merchant identifier 825. In addition, the merchant database 800 preferably contains any information used to access each merchant in field 830.

For example, if a merchant provides shopping via telephone, the access information stored in field 830 may indicate that the merchant is accessed via the telephone network 135, and may contain the appropriate telephone number. Similarly, if a particular merchant provides shopping via a web site, the access information stored in field 830 may indicate that the web site is accessed via the Internet 145, and may contain the appropriate URL address.

A caller on hold with an airline in order to make a flight reservation, for example, is thus provided the opportunity to shop for a book at a bookseller to enjoy during his flight. In another example, callers on hold who are being entertained with music may be provided with access to a music merchant in order to buy the song being played while they are on hold.

In addition to providing the opportunity to make purchases while on hold, various embodiments of the present invention may provide discounts to callers on hold. Accordingly, the merchant database 800 also preferably stores an indication of any discount information in field 835. For example, a bookseller might apply a 10% discount to any book purchase made by a caller on hold. Alternatively, or in addition, the airline could subsidize at least a portion of the cost of a book purchase, as this might encourage the caller to remain on hold. The amount of any provided discount could vary according to any of various factors, including the caller's biographical information, purchase history, whether the caller belongs to a preferred customer class, the length of time the caller has been on hold, or the anticipated length of time the caller will remain on hold. For example, the amount of the discount could increase in direct proportion to the length of time a caller is on hold.

According to another embodiment, IVRU 155 could provide the user with a promotional code or digital certificate, stored in field 835, that enables the user to receive a discount at a merchant. This discount may only be available during the time that the caller is on hold. Alternatively, the discount may be valid for a predetermined period of time. According to another embodiment, the caller is offered the opportunity to shop while on hold, but any applicable discount is only applied if the caller stays on hold after making his purchase and eventually completes a transaction with an agent (or, alternatively, spends a minimum amount of time connected to an agent).

For example, a caller having a cable modem connection to the Internet through his personal computer is on hold with personal computer technical support after placing a telephone call using a conventional telephone. After being placed on hold, the caller is informed of opportunities to shop at a discount at one or more merchants. The caller elects to shop at a bookseller, and the IVRU 155 provides the caller with a promotional code for the bookseller that entitles the caller to 10% off of any purchase initiated while the caller is on hold. Using his cable modem connection to the Internet, the caller may shop at the bookseller's web site while still remaining on hold with the technical support provider.

In another shopping embodiment, the customer selects products to buy with the touch tone keys of his telephone through IVRU 155. For example, after selecting a bookseller the user may be instructed to "press 1 for a listing of recent favorite books, press 2 for travel books, press 3 for paperback mysteries, press 4 for gift books, etc." Each of these categories may be subdivided into smaller categories as the customer drills down into them. In another embodiment, the customer enters the first five letters of the author's last name, and is then presented with a list of his books or a list of author's whose name begins with those five letters.

In another example, many callers on hold with an airline to reserve a flight may also need to reserve a hotel room at their destination. The present invention allows a caller on hold with the airline to connect to a hotel reservation system. As described above, the hotel may offer a benefit or discount (e.g., a free or reduced price, a room upgrade) that the airline may be willing to subsidize in order to keep the caller content while on hold.

Merchant database 800 also preferably includes a merchant rules field 840 that contains information used to determine whether access to a merchant should be provided to a caller. For example, merchant rules field 840 may indicate that a caller should be provided with the option to shop at a bookseller if the caller is calling to reserve an airline flight.

As previously indicated, the offer database 900, shown in FIG. 9, preferably stores information on each offer that may be made to a caller on hold. The offer database 900 maintains a plurality of records, such as the records 910, 911, and 912, each associated with a different offer. Each offer record in database 900 preferably contains an indication of a sponsoring merchant in field 920, an offer identifier in field 925, a benefit in field 930, an indication of any obligation in field 935, and an indication of any offer rules in field 940.

Depending on the terms of the offer, a caller may receive a discount for agreeing to an obligation. For example, a caller on hold with an airline may be offered the opportunity to shop at a bookseller and receive one free paperback book, in exchange for agreeing to receive a monthly travel email from the airline. According to another embodiment, a caller may receive an offer of a benefit in exchange for agreeing to a forward commitment. For example, a caller on hold may agree to buy two more airline tickets in exchange for receiving free long distance telephone service for a month.

According to other embodiments, a caller may receive a discount or reward without any corresponding obligation, or in exchange for remaining on hold. For example, a caller on hold may receive a benefit (e.g., free long distance minutes, free frequent flyer miles) based on the time the caller spends on hold. The caller may have to actually be connected to a telephone agent before being awarded the minutes, in order to prevent fraudulent practices by callers who may, for example, "earn" free minutes on hold, hang up, and call again. Alternatively, the caller might be required to spend at least three minutes speaking with an agent, or the agent herself might have the ability to authorize the provision of a benefit to the caller.

As discussed above, a caller could be provided with a discount valid for the purchase of goods or services at another merchant. Alternatively, the caller could be rewarded with a discount applicable to the merchant with which he is on hold. According to another embodiment, a caller on hold could be provided with a gift after being on hold for a predetermined amount of time. The IVRU 155 could inform the caller at the beginning of the call of the possibility of a reward in order to encourage the caller to remain on hold. According to another embodiment, the caller is offered a gift or reward for which the caller only has to pay shipping and handling. For example, while the caller is on hold, or, alternatively, when the call has been connected to an agent, the caller may be provided with a URL or promotional code enabling the caller to select a prize from a corresponding web site or catalog merchant. Once the caller has made a selection of his gift, the caller is charged for shipping and handling costs.

According to another embodiment, a caller on hold may be provided the opportunity to receive a benefit in exchange for responding to a survey. For example, in exchange for answering ten questions about the vacation the caller is planning, the caller may be entered into a drawing for a first class seat upgrade for a purchased flight. According to another embodiment, a caller may earn a discount or benefit by agreeing to listen to a merchant's marketing pitch. A customer calling an airline, for example, might get a ten dollar discount on her airline ticket in exchange for listening to a pitch from a hotel in the city to which she is traveling.

According to one embodiment of the present invention, discount information field 835 of merchant database 800 contains an offer identifier 925 indicating an offer stored in offer database 900. According to another embodiment of the present invention, sponsoring merchant field 920 of offer database 900 contains a merchant identifier 825 corresponding a merchant record in merchant database 800.

Figure 10A:
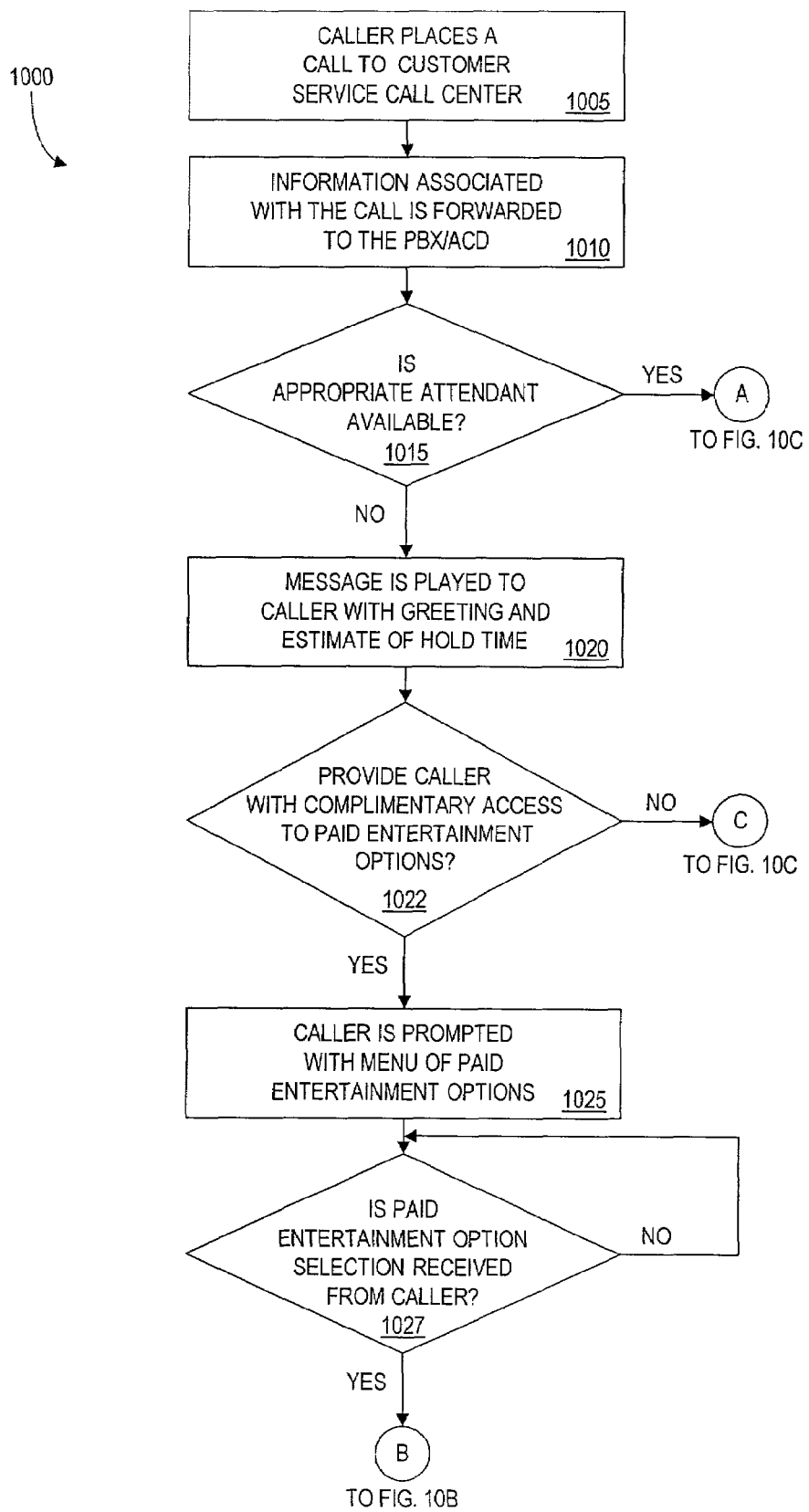
FIGS. 10A, 10B and 10C, collectively, are a flow chart describing an exemplary call handling process implemented by the PBX/ACD of FIG. 2.
Figure 10B:
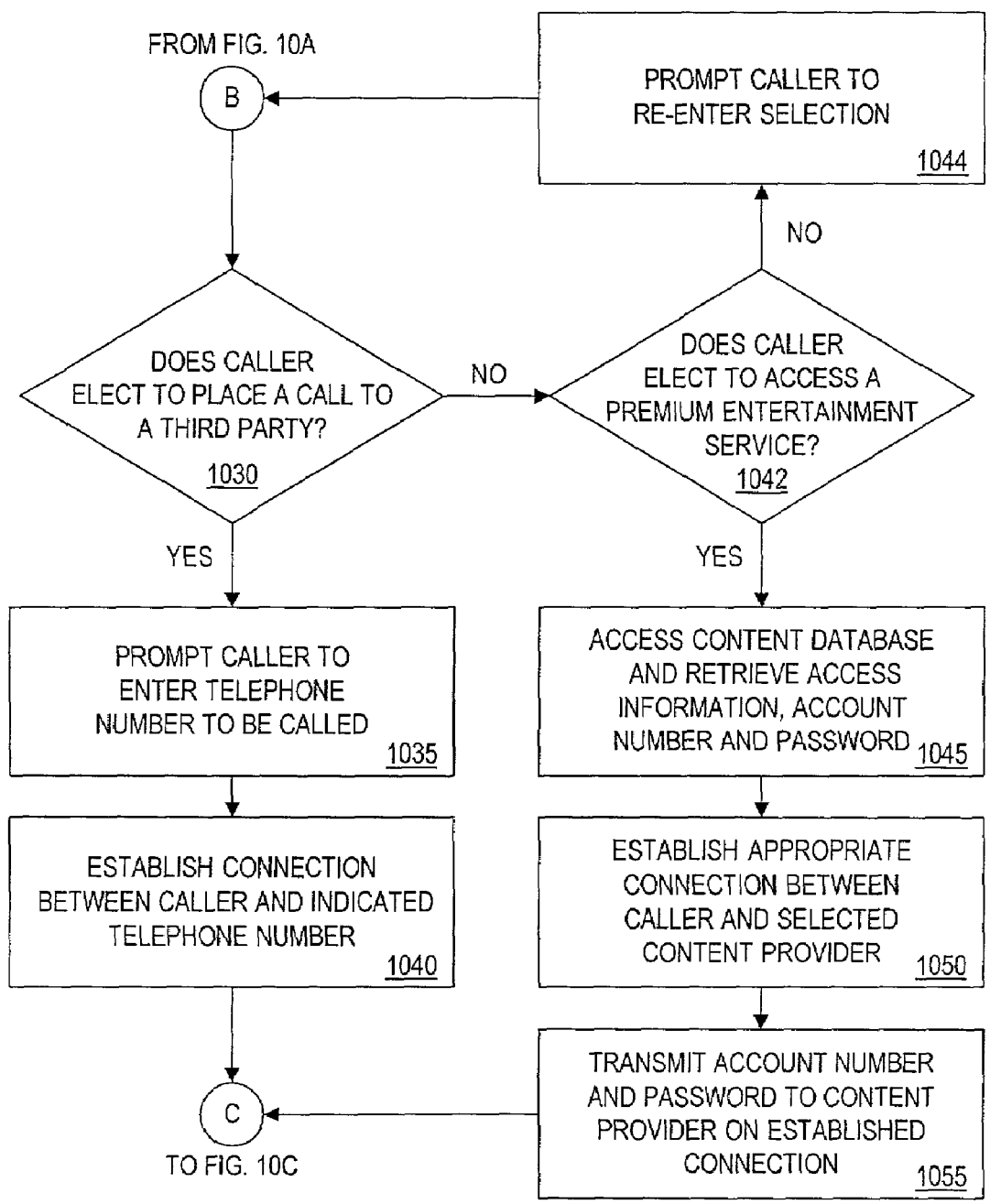
Figure 10C:
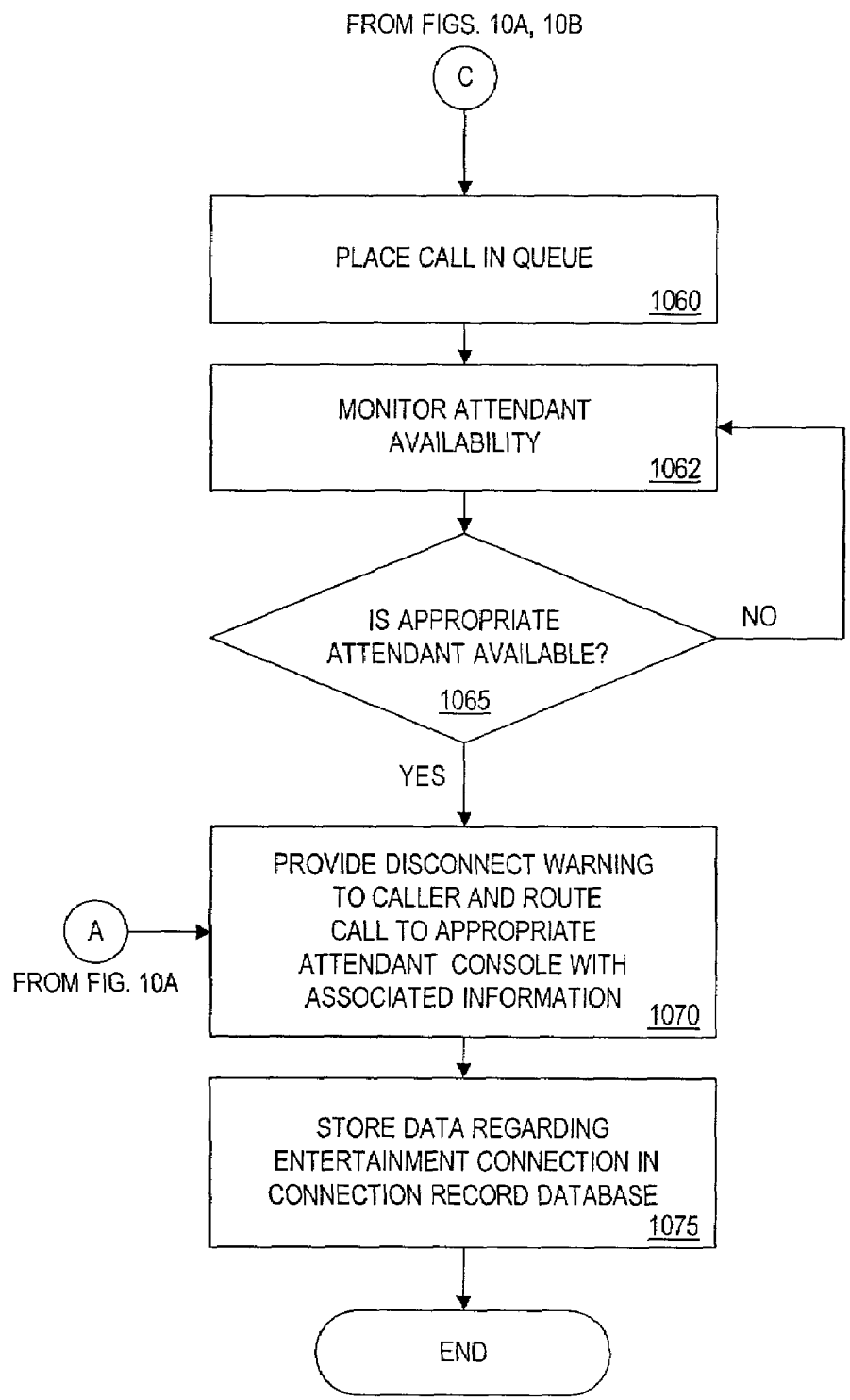

As discussed above, the PBX/ACD 150 preferably executes a call handling process 1000, shown in FIGS. 10A, 10B and 10C, in order to (i) route a call to an appropriate attendant console 160 within a pool of attendants, (ii) transfer calls to the IVRU 155 when no attendants are available to service a particular call, (iii) place a call in a queue, if needed, and (iv) provide a caller on hold with access to the entertainment options.

As illustrated in FIG. 10A, the PBX/ACD 150 begins the processes embodying the principles of the present invention during step 1005, when a caller places a call to the customer service call center 100. The information associated with the call is preferably forwarded to the PBX/ACD 150 during step 1010. For example, the PBX/ACD 150 may access a database, such as the customer account database 300, to retrieve biographical information on the customer placing the call and receive information initially collected by the IVRU 155.

A test is preferably performed during step 1015 to determine if an appropriate attendant is available to handle the call. If it is determined during step 1015 that an appropriate attendant is available to handle the call, then program control proceeds to step 1070 (FIG. 10C), as discussed below, for call handling. If, however, it is determined during step 1015 that an appropriate attendant is not available to handle the call, then a message is preferably played to the caller by the IVRU 155 during step 1020 with an appropriate greeting and estimate of the hold time.

A test is performed during step 1022 to determine if the caller should be provided with complimentary access to the paid entertainment options. As previously indicated, the customer account database 300 includes a flag in field 340 indicating whether the respective customer should be provided with access to the paid entertainment options during any holding periods. In this manner, complimentary access can be limited to certain classes of customers and denied to customers who have previously made fraudulent usage of the complimentary paid entertainment options. If it is determined during step 1022 that the caller should be denied complimentary access to the paid entertainment options, then program control proceeds to step 1060 (FIG. 10C) where the caller will be placed in the queue.

If, however, it is determined during step 1022 that the caller should be provided with complimentary access to the paid entertainment options, then the caller is preferably presented with a menu of the available paid entertainment options by the IVRU 155 during step 1025.

In a preferred embodiment, the entertainment option permits the caller, while on hold, to (i) place a free or subsidized call to a third party or (ii) access one or more premium entertainment services. In one embodiment, the entertainment options offered to the caller correspond to the anticipated period that the caller will be on hold. The PBX/ACD 150 preferably waits until a selection of the desired entertainment option is received from the caller during step 1027. For example, the caller may push a button on a telephone keypad corresponding to a desired entertainment option, may speak the name of the entertainment option, or may otherwise indicate his selection. Alternatively, a failure by the caller to actively select an option may result in a default entertainment option.

Upon receipt of the desired entertainment option, the PBX/ACD 150 performs a test during step 1030 (FIG. 10B) to determine if the caller has elected to place a call to a third party. If it is determined during step 1030 that the caller has selected to place a call to a third party, then the caller is prompted during step 1035 by the IVRU 155 to enter the telephone number of the third party to be called. Thereafter, the PBX/ACD 150 establishes a connection between the caller and the indicated telephone number during step 1040 and program control proceeds to step 1060 (FIG. 10C).

If however, it is determined during step 1030 that the caller has not elected to place a call to a third party, then a further test is performed during step 1042 to determine if the caller has elected to access a premium entertainment service. If it is determined during step 1042 that the caller has not elected to access a premium entertainment service, then the selection provided by the caller is not a valid selection and the caller is preferably prompted to re-enter his selection during step 1044.

If however, it is determined during step 1042 that the caller has elected to access a premium entertainment service, then the content database 600 is preferably accessed during step 1045 to retrieve any access information, account number, and/or password which is used to access the selected premium entertainment service, including the appropriate external network to be utilized; any corresponding network address (Internet), telephone number (shared revenue telephone services) or cable channel (pay-per-view); and any corresponding account number and/or password. For example, if the customer has selected a web site-based premium entertainment service provided by content provider 130, which is accessed via the Internet 145, the PBX/ACD 150 accesses the appropriate record of the content database 600 and retrieves the appropriate stored access information, including the URL address associated with the web site. Alternatively, the PBX/ACD 150 may provide the URL to the customer via the IVRU 155 or via email, for example, and the customer may enter the URL in a web browser to access the desired web site.

Thereafter, during step 1050, the PBX/ACD 150 utilizes the information retrieved during the previous step to establish the appropriate connection between the caller and the selected content provider, such as content provider 130. For example, if the caller has selected a web site-based premium entertainment service provided by content provider 130, which is accessed via the Internet network 145, the PBX/ACD 150 preferably enters the URL in a web browser, such as Netscape Navigator, to access the desired web site.

Once the connection is established to the selected content provider during step 1050, such as the web-based content provider 130, the account number and password retrieved during step 1045 are preferably transmitted to the content provider 130 during step 1055. Thereafter, program control proceeds to step 1060 (FIG. 10C).

The call is placed in the queue during step 1060. Alternatively, the call may be placed in the queue at any time after it is determined that an appropriate attendant is not available (step 1015 of FIG. 10A) and prior to step 1062. The PBX/ACD 150 preferably monitors the availability of the attendants during step 1062 to determine when an attendant is available. Thus, a test is performed during step 1065 to determine if an appropriate attendant is available. If it is determined during step 1065 that an appropriate attendant is not available, then program control returns to step 1062 where the PBX/ACD 150 continues monitoring the availability of the attendants until an attendant is available. If, however, it is determined during step 1065 that an appropriate attendant is available, then a disconnect warning is provided to the caller which permits the caller to choose when to have the call routed to an appropriate attendant console 160 during step 1070, together with any associated collected information, in the manner described above. In one embodiment, the caller can elect to continue accessing the entertainment option beyond the complimentary time offered by the call center 100 by providing a payment.

Finally, the PBX/ACD 150 preferably creates a record of the entertainment option connection in the connection record database 700 during step 1075. As previously indicated, this record may be utilized to confirm any billing information received from the content provider 130. Thereafter, the PBX/ACD 150 exits the process.

The PBX/ACD 150 is preferably billed by each content or service provider for the total connection time for each caller. The billing information can be verified using the connection record database 600.

Figure 11A:
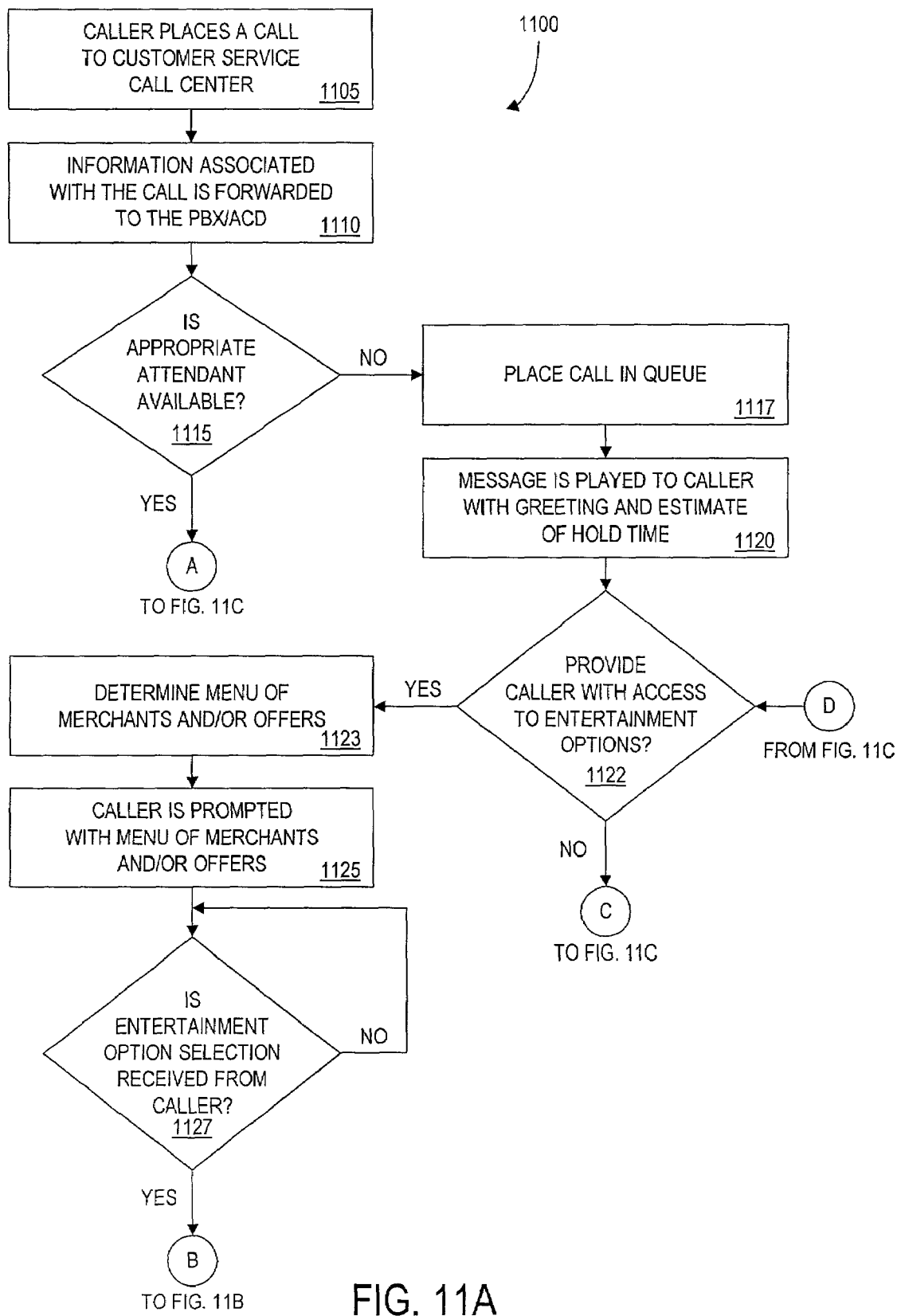
FIGS. 11A, 11B and 11C, collectively, are a flow chart describing an exemplary call handling process implemented by the PBX/ACD of FIG. 2.
Figure 11B:
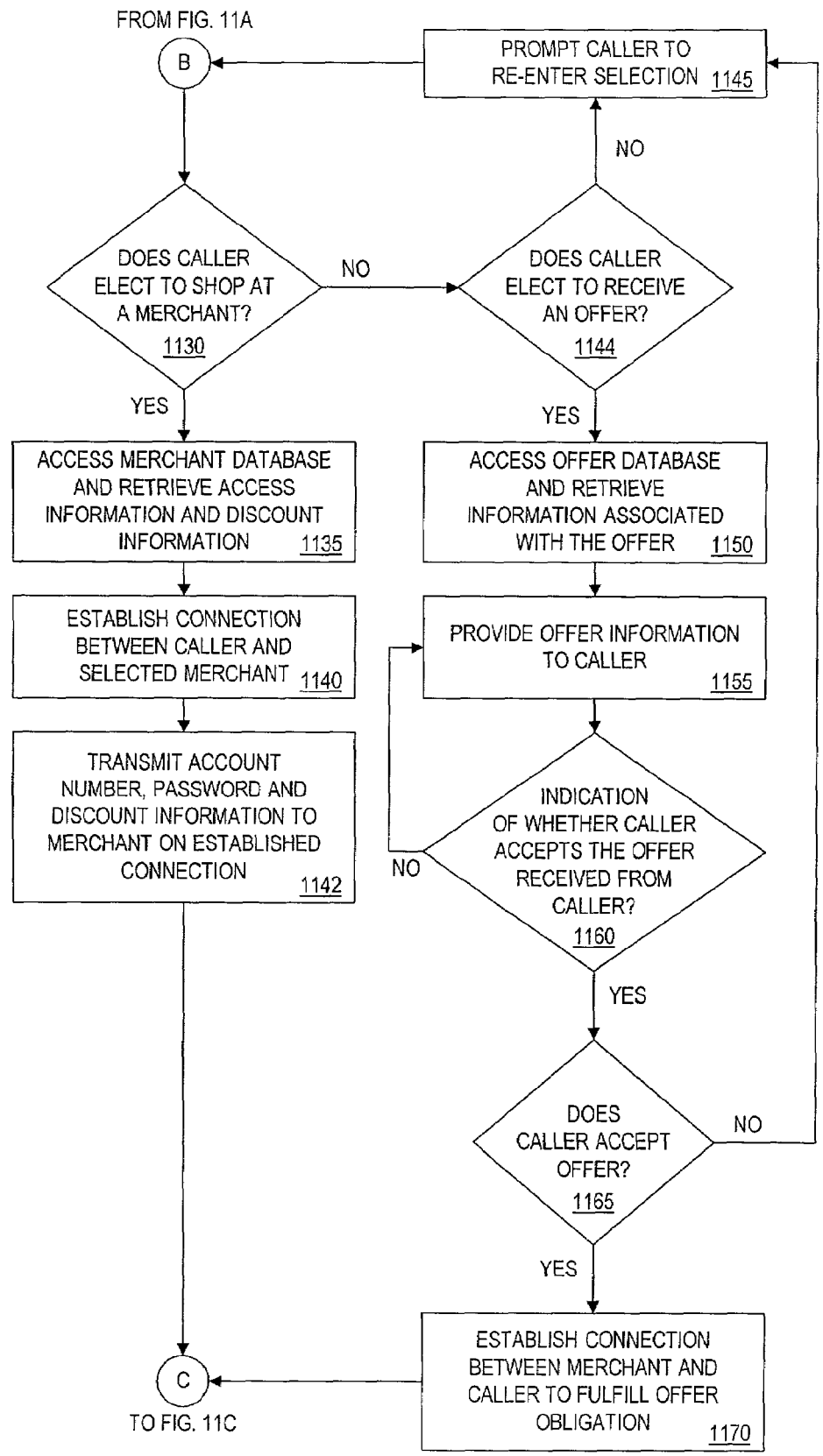
Figure 11C:
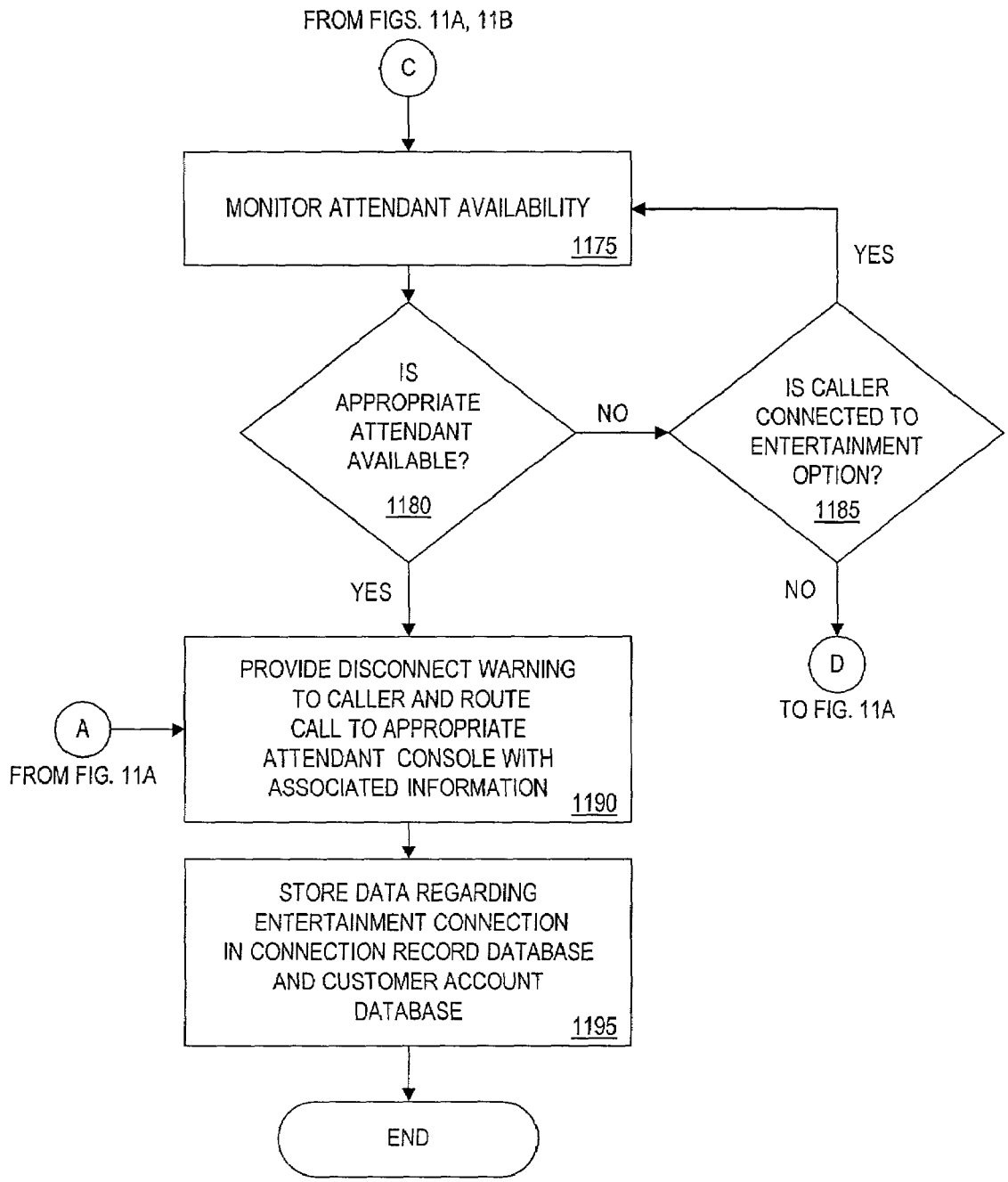

As discussed above, the PBX/ACD 150 also preferably provides the functionality of call handling process 1100, shown in FIGS. 11A, 11B and 11C, in order to (i) route a call to an appropriate attendant console 160 within a pool of attendants, (ii) transfer calls to the IVRU 155 when no attendants are available to service a particular call, (iii) place a call in a queue, if needed, (iv) provide a caller on hold with access to one or more merchants, and (v) provide the caller on hold with one or more offers. Call handling process 1100 may be performed in conjunction with call handling process 1000.

As illustrated in FIG. 11A, the PBX/ACD 150 begins a process of the present invention during step 1105, when a caller places a call to the customer service call center 100. The information associated with the call is preferably forwarded to the PBX/ACD 150 during step 1110. For example, the PBX/ACD 150 may access a database, such as the customer account database 300, to retrieve biographical information on the customer placing the call and receive information initially collected by the IVRU 155.

A test is preferably performed during step 1115 to determine if an appropriate attendant is available to handle the call. If it is determined during step 1115 that an appropriate attendant is available to handle the call, then program control proceeds to step 1190 (FIG. 11C), as discussed below, for call handling. If, however, it is determined during step 1115 that an appropriate attendant is not available to handle the call, the call is placed in a queue during step 1117. A message is preferably played to the caller by the IVRU 155 during step 1120 with an appropriate greeting and estimate of the hold time.

A test is performed during step 1122 to determine if the caller should be provided with access to the entertainment options. As previously indicated, the customer account database 300 includes a flag in field 340 indicating whether the respective customer should be provided with such access during any holding periods. In this manner, access can be limited to certain classes of customers and denied to customers who have previously made fraudulent usage of the entertainment options. If it is determined during step 1122 that the caller should be denied access to the entertainment options, then program control proceeds to step 1175 (FIG. 11C).

If, however, it is determined during step 1122 that the caller should be provided with access to the entertainment options, then PBX/ACD determines a menu of merchants and/or offers to present to the caller in step 1123. The PBX/ACD preferably determines a set of appropriate merchants and/or offers based on the information associated with the call received during step 1110, the merchant rules 840 contained in the merchant database 800, the offer rules 940 contained in the offer database 900, or any combination thereof. According to an alternative embodiment, the entertainment options offered to the caller correspond to the anticipated period that the caller will be on hold. The caller is preferably presented with the menu of merchants and/or offers by the IVRU 155 during step 1125. Alternatively, the caller may have the option to be presented a menu of merchants and a separate menu of offers.

The PBX/ACD 150 preferably waits until a selection of the desired merchant or offer is received from the caller during step 1127. For example, the caller may push a button on a telephone keypad corresponding to a desired entertainment option, may speak the name of the entertainment option, may click on a link on a displayed webpage, or may otherwise indicate his selection. Alternatively, a failure by the caller to actively select an option may result in a default entertainment option. Upon receipt of the desired entertainment option, the PBX/ACD 150 performs a test during step 1130 (FIG. 11B) to determine if the caller has elected to be connected to a merchant.

If it is determined during step 1130 that the caller has elected to be connected to a merchant, then the merchant database 800 is preferably accessed during step 1135 to retrieve any access information which is used to access the selected merchant, including the appropriate external network to be utilized; any corresponding network address (e.g., corresponding URL), telephone number, or cable channel; and any corresponding account number and/or password.

Preferably, the merchant database 800 is also accessed during step 1135 to retrieve any information relating to complimentary discounts, promotions, rewards or offers available to the customer while shopping at the merchant. For example, if the caller has selected a merchant 132 having a web site accessible via the Internet 145, the PBX/ACD 150 accesses the appropriate record of the merchant database 800 and retrieves the appropriate stored discount information and access information, including the URL address associated with the web site. Alternatively, access information may also contain any information about discounts for which the customer is eligible. For example, a stored URL address may provide the customer access to items for which shipping is free, or may otherwise indicate to the merchant 132 that the customer is eligible to receive free shipping. Thereafter, the PBX/ACD 150 establishes a connection between the caller and the indicated web site during step 1140 based on the URL address.

According to another example, if the caller has selected a merchant 122 accessible via the telephone network 135, the PBX/ACD 150 accesses the appropriate record of the merchant database 800 and retrieves the appropriate stored discount information and access information, including the telephone number associated with merchant 122. Thereafter, the PBX/ACD 150 establishes a telephone connection between the caller and the merchant 122 during step 1140 based on the telephone number.

Alternatively, the PBX/ACD 150 may provide the access information (e.g., URL, telephone number) to the customer via the IVRU 155 or via email, for example, and the customer may establish a connection to the selected merchant.

Once the connection is established to the selected merchant during step 1140, such as the web-based merchant 132, any account number, password, or discount information retrieved during step 1135 are preferably transmitted to the merchant 132 during step 1142. Program control then proceeds to step 1175 (FIG. 11C).

If, however, it is determined during step 1130 that the caller has not elected to be connected to a merchant, then a further test is performed during step 1144 to determine if the caller has elected to receive an offer. If it is determined during step 1144 that the caller has not elected to receive an offer, then the selection provided by the caller is not a valid selection and the caller is preferably prompted to re-enter his selection during step 1145.

If, however, it is determined during step 1144 that the caller has elected to receive an offer, then the offer database 900 is preferably accessed during step 1150 to retrieve the information associated with the offer, such as the sponsoring merchant 920, the benefit 930 and the obligation 935. This offer information is then provided to the caller via IVRU 155 during step 1155. For example, a caller electing to receive an offer for free frequent flyer miles from an airline is provided via IVRU 155 with an offer requiring the caller to speak with a magazine subscription marketer in exchange for receiving 500 frequent flyer miles from that airline.

The PBX/ACD 150 preferably waits until an indication of whether the caller accepts the offer is received from the caller during step 1160. Upon receipt of the caller's response, the PBX/ACD 150 performs a test during step 1165 to determine if the caller has accepted the offer. If it is determined during step 1165 that the caller has decided not to accept the offer, then PBX/ACD 150 prompts the caller to select another entertainment option at step 1145.

If, however, it is determined during step 1165 that the caller has accepted the offer, then PBX/ACD 150 preferably performs any steps necessary for the caller to fulfill any obligations of the offer during step 1170. For example, if the caller has accepted an offer to receive frequent flyer miles in return for fulfilling an obligation to be connected to a merchant in order to listen to a marketing pitch by a sponsoring merchant, PBX/ACD 150 may determine the telephone number of the sponsoring merchant, call the merchant telephone number, and connect the caller to the sponsoring merchant, in a manner as described above with respect to steps 1135 through 1142. Thereafter, program control proceeds to step 1175 (FIG. 11C).

The PBX/ACD 150 preferably monitors the availability of the attendants during step 1175 to determine when an attendant is available. Thus, a test is performed during step 1180 to determine if an appropriate attendant is available.

If it is determined during step 1180 that an appropriate attendant is not available, then a test is performed during 1185 to determine if the caller is still connected to an entertainment option. If it is determined that the caller is still connected to an entertainment option, then program control returns to step 1175 where the PBX/ACD 150 continues monitoring the availability of the attendants until an attendant is available.

If, however, it is determined that the caller is no longer connected to an entertainment option, then program control returns to step 1122 where the PBX/ACD 150 determines whether to provide the caller with a menu of available entertainment options. For example, the caller may have completed a transaction with a merchant 132 while on hold and may wish to continue shopping at a different merchant.

If it is determined during step 1180 that an appropriate attendant is available, then a disconnect warning is provided to the caller which permits the caller to choose when to have the call routed to an appropriate attendant console 160 during step 1190, together with any associated collected information, in the manner described above.

Finally, the PBX/ACD 150 preferably creates a record of the entertainment option connection in the connection record database 700 during step 1195. As previously indicated, this record may be utilized to confirm any billing information received from the merchant 132. During step 1195, PBX/ACD 150 also preferably updates customer account database 300 to indicate information about the caller's time on hold, such as any purchases made by the customer, merchants visited, offers accepted (or rejected), obligations fulfilled, and benefits granted. For example, a merchant 122 may transmit to PBX/ACD 150 an indication of the purchases the caller made while on hold. The purchase information may be used to determine appropriate merchants to provide as entertainment options during a subsequent call by the caller. Thereafter, the PBX/ACD 150 exits the process.

It is to be understood that the embodiments and variations shown and described herein are merely illustrative of the principles of this invention and that various modifications may be implemented by those skilled in the art without departing from the scope and spirit of the invention.

The invention claimed is:

1. A method comprising:
   receiving an incoming call from a caller via a first connection;
   placing the incoming call in a queue;
   determining information that is associated with the incoming call;
   providing to the caller a menu indicating at least one merchant;
   receiving from the caller an indication of a merchant;
   determining a telephone number associated with the merchant;
   establishing a second connection between the caller and the merchant based on the telephone number, the second connection enabling the caller to make a purchase from the merchant while the incoming call remains in the queue; and
   transferring the incoming call from the queue to an attendant.

2. The method of claim 1, in which determining the information that is associated with the incoming call comprises:
   receiving the information that is associated with the incoming call from the caller via an interactive voice response unit (IVRU).

3. The method of claim 1, in which determining the information that is associated with the incoming call comprises:
   retrieving the information that is associated with the incoming call from a record of a database, in which the record is associated with the caller.

4. The method of claim 1, in which determining the information that is associated with the incoming call comprises:
   retrieving the information that is associated with the incoming call from a record of a database, in which the record is associated with the incoming call.

5. The method of claim 1, in which providing to the caller the menu comprises:
   providing to the caller the menu based on the information that is associated with the incoming call.

6. The method of claim 1, in which the information that is associated with the incoming call comprises at least one of:
   a time the incoming call was received,
   a time the incoming call has been on hold,
   an indication of a category of the incoming call,
   an indication of a position of the incoming call within the queue,
   a name of the caller,
   an identifier that identifies the caller,
   a telephone number associated with the caller,
   an address associated with the caller,
   data indicating at least one purchase associated with the caller,
   data indicating at least one reservation associated with the caller,
   an indication of an area of expertise of the caller,
   an indication of a rate charged for expertise of the caller, and
   an account identifier that identifies a financial account associated with the caller.

7. A method, comprising:
   receiving an incoming telephone call from a caller;
   determining, after the receiving, that an attendant is unavailable to answer the call;
   placing, after the determining of the lack of attendant availability, the call in a queue;
   offering, after the placing of the call in the queue, the caller a plurality of entertainment options;
   receiving, after the offering and from the caller, an indication of a selection of one of the plurality of entertainment options;
   establishing, after the receiving of the indication of the selected entertainment option, a connection between the caller and the selected entertainment option while the call remains in the queue;
   determining, after the establishing of the connection between the caller and the selected entertainment option, that the attendant is available to answer the call;
   notifying, after the determination that the attendant is available, the caller that the attendant is available; and
   allowing the caller, after notifying the caller, to choose between (i) maintaining the connection with the selected entertainment option and (ii) establishing a connection with the attendant.

* * * * *